United States Patent
Gu

(10) Patent No.: US 9,893,558 B2
(45) Date of Patent: Feb. 13, 2018

(54) WIRELESS CHARGING DEVICE AND METHOD

(71) Applicant: ZTE CORPORATION, Shenzhen, Guangdong Province (CN)

(72) Inventor: Yunfeng Gu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 97 days.

(21) Appl. No.: 14/906,270

(22) PCT Filed: Sep. 12, 2013

(86) PCT No.: PCT/CN2013/083376
§ 371 (c)(1),
(2) Date: Jan. 20, 2016

(87) PCT Pub. No.: WO2014/166204
PCT Pub. Date: Oct. 16, 2014

(65) Prior Publication Data
US 2016/0164334 A1 Jun. 9, 2016

(30) Foreign Application Priority Data
Jul. 24, 2013 (CN) .......................... 2013 1 0314538

(51) Int. Cl.
*H02J 7/00* (2006.01)
*H02J 7/02* (2016.01)
*H02J 17/00* (2006.01)
*H02J 7/04* (2006.01)
*H02J 50/12* (2016.01)
*H02J 50/80* (2016.01)

(52) U.S. Cl.
CPC .............. *H02J 7/025* (2013.01); *H02J 7/042* (2013.01); *H02J 17/00* (2013.01); *H02J 50/12* (2016.02); *H02J 50/80* (2016.02)

(58) Field of Classification Search
CPC .. H02J 7/025; H02J 50/12; H02J 7/042; H02J 17/00; H02J 50/80
USPC ................................... 320/107–108
See application file for complete search history.

(56) References Cited

U.S. PATENT DOCUMENTS 9,054,542 B2 * 6/2015 Baarman ................. H02J 17/00
2009/0175060 A1 7/2009 Onishi et al.
2011/0285211 A1 11/2011 Endo et al.
(Continued)

FOREIGN PATENT DOCUMENTS

CN 101924387 A 12/2010
CN 102611213 A 7/2012
(Continued)

*Primary Examiner* — Stacy Whitmore
(74) *Attorney, Agent, or Firm* — Ling Wu; Stephen Yang; Ling and Yang Intellectual Property

(57) ABSTRACT

Disclosed are a wireless charging apparatus and method, wherein the device includes: a receiving coil, connected to a dynamic matching circuit, and the dynamic matching circuit includes a control circuit and at least one kind of matching circuit; the control circuit is connected to the at least one kind of matching circuit; the control circuit is configured to: transmit a control signal for controlling ON and OFF of the at least one kind of matching circuit. The apparatus and method solve the problem of using different wireless charging standards to perform wireless charging and realize a flexible wireless charging mechanism.

18 Claims, 3 Drawing Sheets

(56) References Cited

U.S. PATENT DOCUMENTS

| | | | |
|---|---|---|---|
| 2011/0304216 A1* | 12/2011 | Baarman | H02J 17/00 307/104 |
| 2012/0038220 A1 | 2/2012 | Kim et al. | |
| 2013/0335020 A1* | 12/2013 | Moore | H02J 7/025 320/109 |
| 2014/0191818 A1* | 7/2014 | Waffenschmidt | H02J 7/025 333/17.1 |
| 2014/0210686 A1* | 7/2014 | Ali | H01Q 3/267 343/861 |
| 2014/0225447 A1* | 8/2014 | Teggatz | H02J 17/00 307/104 |
| 2014/0306654 A1* | 10/2014 | Partovi | H02J 7/025 320/108 |
| 2014/0354223 A1* | 12/2014 | Lee | H02J 5/005 320/108 |
| 2015/0031334 A1* | 1/2015 | Wu | H02J 5/005 455/411 |
| 2015/0236520 A1* | 8/2015 | Baarman | H02J 5/005 307/104 |
| 2016/0006289 A1* | 1/2016 | Sever | H02J 7/025 320/108 |
| 2016/0065005 A1* | 3/2016 | Won | H04B 5/0037 307/104 |
| 2016/0087686 A1* | 3/2016 | Won | H04B 5/0037 307/104 |

FOREIGN PATENT DOCUMENTS

| | | |
|---|---|---|
| CN | 102780515 A | 7/2012 |
| CN | 202424281 U | 9/2012 |
| EP | 2804290 A1 | 11/2014 |
| JP | 2011523336 A | 8/2011 |
| JP | 2012254003 A | 12/2012 |
| KR | 20130081629 A | 7/2013 |
| WO | 2013105776 A1 | 7/2013 |

* cited by examiner

WIRELESS CHARGING DEVICE AND METHOD

TECHNICAL FIELD

The present document relates to the field of mobile communications, and more particularly, to a wireless charging apparatus and method.

BACKGROUND OF THE RELATED ART

Currently, the mobile terminal has been used more and more widely, and the function of the terminal has been very strong and is full of rich entertainment, people can listen music, watch television, access Internet and so on. In the process of using a mobile terminal, due to the limitation of battery capacity, people can find that the battery power is soon used up, and it often needs to charge the battery. The appearance of the wireless charging technology in which the electromagnetic induction is the representative gives consumers the convenience. A mobile phone can be easily charged through a wireless charging device, so that the consumers get rid of the shackles of cable.

There are many principles for realizing wireless charging, such as electromagnetic induction, resonance, RF transmission and so on. Due to advantages of the electromagnetic induction technology in efficiency, cost and safety, it is currently used widely in the consumer electronics field. Existing products are basically using the electromagnetic induction technology-based wireless charging technology. In order to promote the rapid development of electromagnetic induction wireless charging technology, two international organizations: the WPC (Wireless Power Consortium) and the PMA (Power Matters Alliance) have been established.

The Wireless Power Consortium is referred to as WPC and was founded in 2008, and it is the first organization promoting the wireless charging technology standardization in the industry. The WPC takes safety and charging efficiency as the starting point, uses the near-field electromagnetic induction technology as the international standard of the low power portable electronic device charging, and its label is defined as Qi. The electromagnetic induction technology is with centuries of history, because there is no contact point, it has high security and reliability in harsh environments, and in the technical specifications, its power distance is less than a centimeter, and the transmitting end can focally transmit the power to the receiving end.

The PMA (Power Matters Alliance) is launched by the Duracell Powermat company and is an electromagnetic induction based wireless charging standard. In 2012, industry giants such as AT&T, google, Starbucks etc. have joined in the PMA organization and are dedicated to promoting PMA standard-based wireless charging technology that currently has a lot of applications in the North American market.

Both the WPC and the PMA are wireless charging standards based on the electromagnetic induction technology, but they are different in technical details such as communication protocol, transmission frequency and so on. The WPC has been widely used in Asia and Europe; the PMA is conducting large-scale promotion in North America.

SUMMARY OF THE INVENTION

The present document provides a wireless charging apparatus and method to solve the problem of using different wireless charging standards for wireless charging.

A wireless charging apparatus comprises a receiving coil, wherein the receiving coil is connected to a dynamic matching circuit, and the dynamic matching circuit comprises a control circuit and at least one kind of matching circuit; the control circuit and is connected to the at least one kind of matching circuit;

the control circuit is configured to: transmit a control signal for controlling ON and OFF of the at least one kind of matching circuit.

Preferably, the matching circuit comprises the following types:

WPC matching circuit and PMA matching circuit.

Preferably, the apparatus further comprises a wireless charging receiving circuit;

the wireless charging receiving circuit is configured to: connect to a control circuit of the dynamic matching circuit through a control line;

the wireless charging receiving circuit is configured to: send a control signal to the dynamic matching circuit via the control line to control the dynamic matching circuit selecting one matching circuit from the at least one kind of matching circuit to be connected.

Preferably, the control circuit is configured as a switch switching between the at least one kind of matching circuit, and when the switch switches to one matching circuit, the matching circuit is connected.

Preferably, the control circuit is a variable capacitor.

Preferably, the dynamic matching circuit comprises at least two kinds of matching circuits.

The present document further provides a wireless charging method, comprising:

a wireless charging receiving circuit sending a control signal to the dynamic matching circuit to instruct the dynamic matching circuit to select a corresponding matching circuit from the at least one kind of matching circuit to be connected;

the dynamic matching circuit switching and connecting to the corresponding circuit in accordance with the control signal and starting to charge.

Preferably, before the step of the wireless charging receiving circuit sending a control signal to the dynamic matching circuit, further comprising:

the receiving coil sending received handshake information to the wireless charging receiving circuit via the dynamic matching circuit;

the wireless charging receiving circuit generating the control signal according to the handshake information.

Preferably, when the receiving coil sends the received handshake information to the wireless charging receiving circuit via the dynamic matching circuit, the dynamic matching circuit represents high and low levels of a digital signal by changes of the transmission frequency, and uses the digital signal to carry the handshake information.

Preferably, the wireless charging receiving circuit generating the control signal according to the handshake information comprises:

the wireless charging receiving circuit judging a wireless charging standard corresponding to the received handshake information, and determining the type of the required matching circuit;

the wireless charging receiving circuit generating the control signal, and indicating the matching circuit selected by the control circuit in the control signal.

The embodiment of the present invention provides a wireless charging apparatus and method, a receiving coil of the wireless charging apparatus is connected to a dynamic matching circuit, and the dynamic matching circuit comprises a control circuit and at least one kind of matching circuit; the control circuit is connected to the at least one kind of matching circuits respectively, and the control circuit is used for transmitting a control signal for controlling ON and OFF of the at least one kind of matching circuit, and the dynamic matching circuit switches between different wireless charging standard types of matching circuits in accordance with the control signal, selects an appropriate matching circuit to be connected, which achieves a flexible wireless charging mechanism and solves the problem of using different wireless charging standards for wireless charging.

PREFERRED EMBODIMENTS OF THE INVENTION

Figure 1:
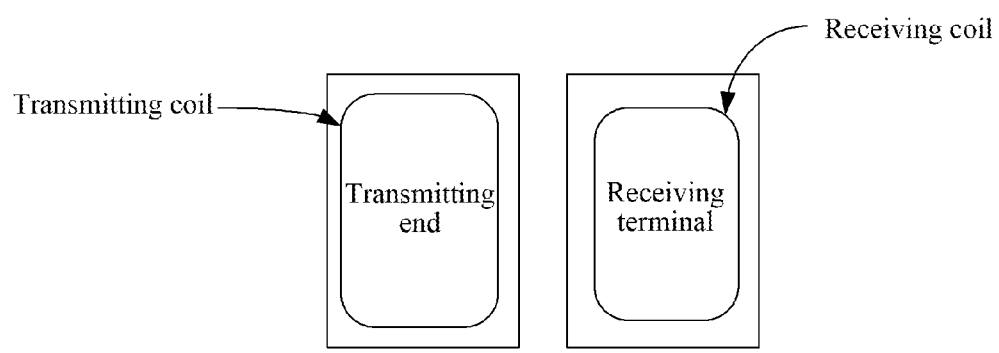
FIG. 1 is a schematic diagram of a wireless charging apparatus.
Figure 2:
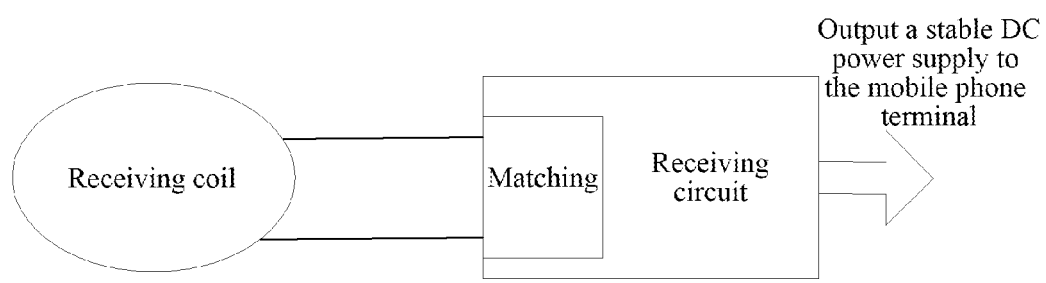
FIG. 2 is a block diagram of working principle of a wireless charging receiving terminal.

The wireless charging technology represented by the electromagnetic induction is the current mainstream wireless charging technology, and both the PMA and the WPC use the electromagnetic induction technology, its basic structure is shown in FIG. 1, one is the transmitting end and the other is the receiving terminal, and the induction coil is used between the transmitting end and the receiving terminal to achieve the transfer of power energy. A principle block diagram of the receiving terminal is shown in FIG. 2, the receiving coil receives the power and transfers it to the receiving circuit; the front end of the receiving circuit has one matching circuit, and by adjusting the matching circuit, the receiving circuit is in the optimal reception state, and the transmission efficiency is maximized, and the receiving circuit completes functions such as rectification and regulation, and the output works as the stable DC power supply used to charge the mobile terminal. The matching circuit is very important, only adjusting the matching can make the receiving circuit work in the optimal working state and the receiving efficiency of the wireless charging achieves the maximum. Different wireless charging circuits have different matching circuits. In the actual application process, the WPC and the PMA have different transmission frequencies and matching circuits.

Both the WPC and the PMA currently have applications in different areas. The WPC is used more in Asia and Europe; while the PMA is promoted relatively in large scale in North America. Currently the market has the requirement to be compatible with both the WPC and the PMA, and both the WPC and the PMA are compatible in the same terminal.

In the current technology, in order to be compatible with both the WPC and the PMA in the same terminal, the design of matching circuit may use the balancing point of the WPC and the PMA, to make both the WPC and the PMA work efficiently, but neither of them work in the optimal working state; it may be WPC based and supplemented by PMA, the matching circuit of WPC is used, the WPC is in the optimal working state while the working efficiency of the PMA is low; or it may be PMA based and supplemented by WPC, the matching circuit of PMA is used, the PMA is in the optimal working state, and the working efficiency of the WPC is low.

To solve the abovementioned technical problem, to be compatible with the two wireless charging standards: PMA and WPC, the embodiment of the present invention provides a wireless charging apparatus and method.

First, in conjunction with the accompanying drawings, the first embodiment of the present invention will be described.

Figure 3:
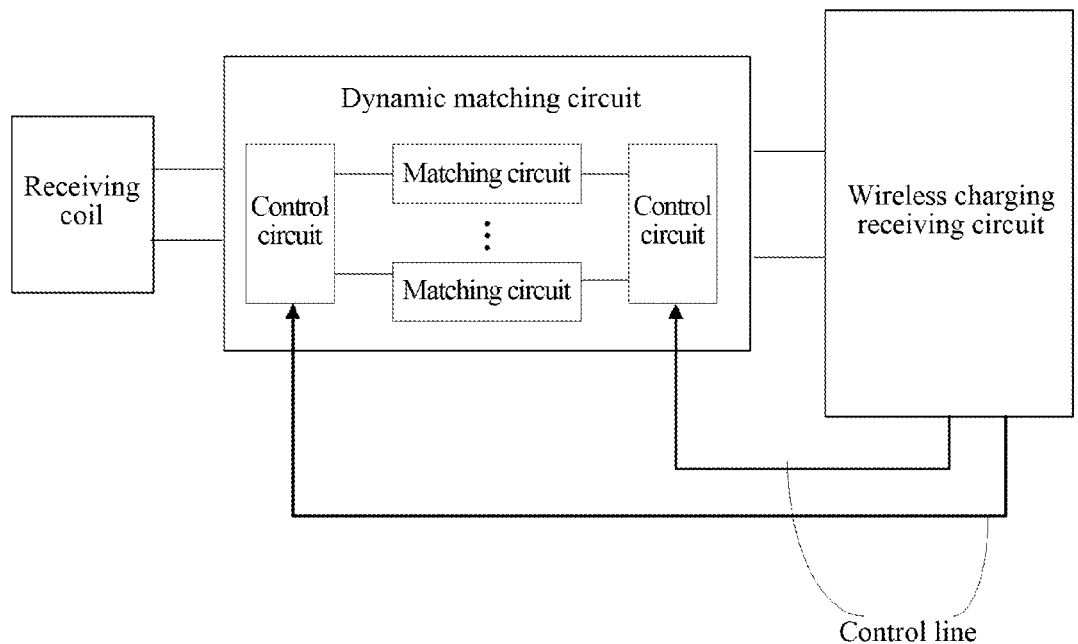
FIG. 3 is a structural diagram of a wireless charging apparatus provided in a first embodiment of the present invention.

The embodiment of the present invention provides a wireless charging apparatus, and its structure is shown in FIG. 3, comprising: a coil, a dynamic matching circuit and a wireless charging receiving circuit.

The dynamic matching circuit comprises a control circuit and at least one kind of matching circuit; the control circuit is connected to the at least one kind of matching circuit;

the control circuit is used for transmitting a control signal for controlling the ON and OFF of the at least one kind of matching circuit.

Preferably, the matching circuit comprises the following types:

WPC matching circuit and PMA matching circuit.

Preferably, the apparatus further comprises a wireless charging receiving circuit;

the wireless charging receiving circuit is connected to a control circuit of the dynamic matching circuit via a control line;

the wireless charging receiving circuit sending a control signal to the dynamic matching circuit via the control line to control the dynamic matching circuit selecting a matching circuit from the at least one kind of matching circuit to be connected.

Preferably, the dynamic matching circuit comprises at least two kinds of matching circuits.

The embodiment of the present invention adds a dynamic matching circuit module to make the wireless charging work efficiently in both the WPC and the PMA. When there are two or more kinds of matching circuits (corresponding to different wireless charging standards), the principles of using the technical solution provided in the embodiment of the present invention to select and switch between the matching circuits are the same.

The receiving coil is a wireless charging energy receiving carrier, and also an information transmission channel in the wireless charging process; the dynamic matching circuit module implements a dynamic adjustment of the matching circuits in different standards such as the WPC and the PMA, and the WPC matching is used in the WPC mode and the PMA matching is used in the PMA mode so that the wireless charging efficiency is maximum. The current wireless charging receiving circuit has a simple processing capability, and it may not require additional entities. The wireless charging receiving circuit module processes information sent by the receiving coil, and judges whether the current mode is the WPC mode or the PMA mode according to the received information, and controls the dynamic matching circuit module according to the judgment result, adjusts the matching circuit, receives the wireless energy, and outputs a stable DC voltage for charging the mobile phone terminal after the processing is completed.

Figure 4:
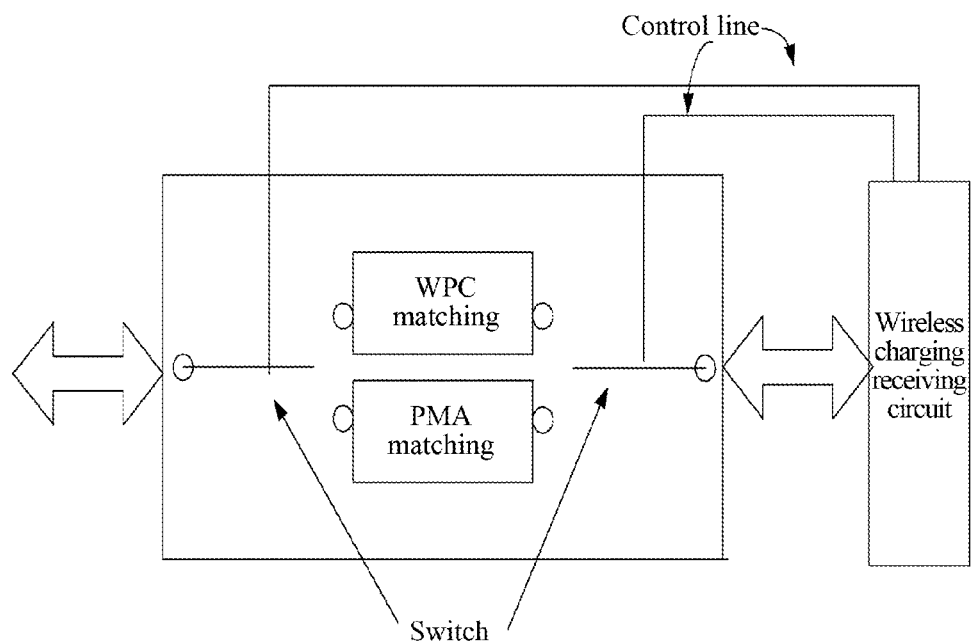
FIG. 4 is a structural diagram of a dynamic matching circuit using a control circuit in the form of switch.

Wherein, there are many methods for implementing the dynamic matching circuit. For example: the control circuit in particular may be a switch switching between the at least one kind of matching circuit, when the switch switches to a matching circuit, the matching circuit is connected. As shown in FIG. 4, the switch can be used to switch to different matching channels, and the switch switches to the A channel in the WPC mode and calls the A matching; the switch switches to the B channel in the PMA mode and calls the B matching.

Figure 5:
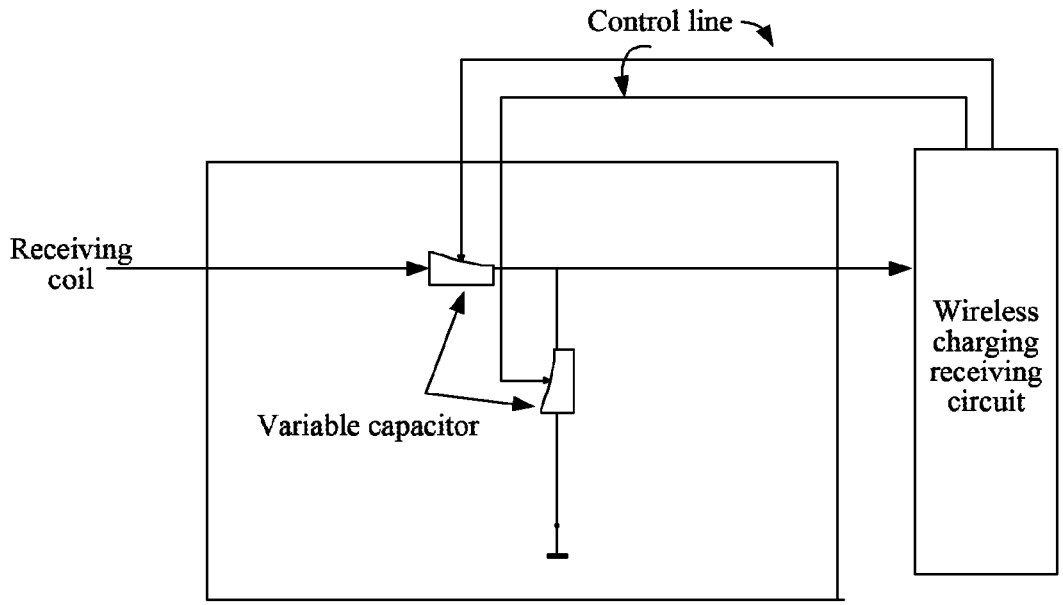
FIG. 5 is a structural diagram of a dynamic matching circuit using a control circuit in the form of variable capacitor.

The control circuit can also be a variable capacitor, as shown in FIG. 5, through the variable capacitor, in different modes, the wireless charging receiving circuit can be used to control and adjust the variable capacitor to make the matching circuit optimal.

Hereinafter, in conjunction with the accompanying drawings, the second embodiment of the present invention will be described.

Figure 6:
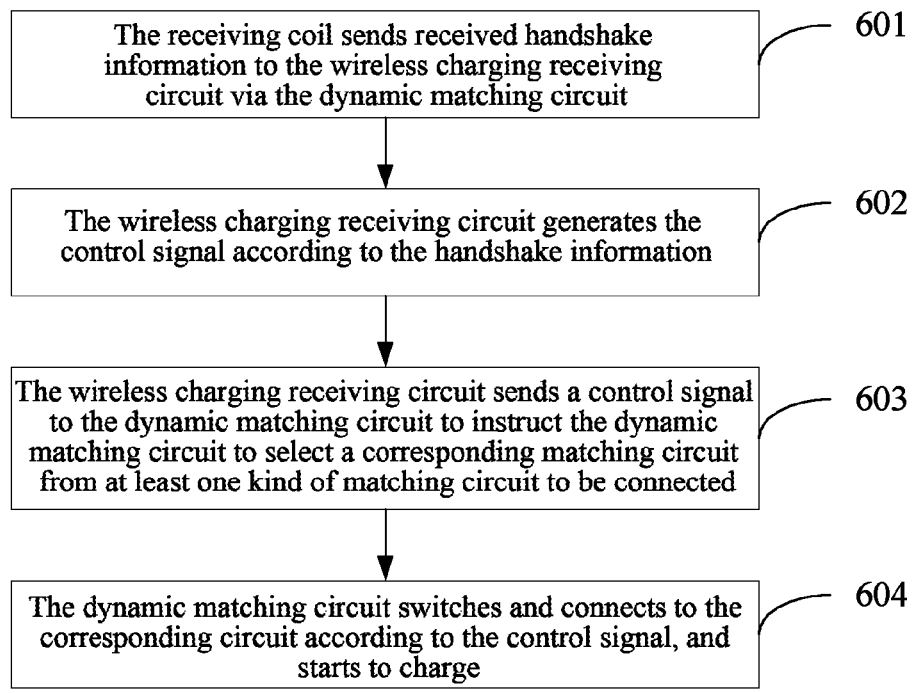
FIG. 6 is a flow chart of a wireless charging method provided in a second embodiment of the present invention.

The embodiment of the present invention provides a wireless charging method. In the following, two cases of the dynamic matching circuit having a WPC matching circuit and a PMA matching circuit are taken as examples for illustration. Combined with the wireless charging apparatus provided in the first embodiment of the present invention, the process of using the wireless charging method provided in the embodiment of the present invention to accomplish the wireless charging is shown in FIG. 6, comprising:

in step 601, the receiving coil sends received handshake information to the wireless charging receiving circuit via the dynamic matching circuit;

when the receiving coil sends the received handshake information to the wireless charging receiving circuit via the dynamic matching circuit, the dynamic matching circuit represents high and low levels of a digital signal by changes of the transmission frequency, and uses the digital signal to carry the handshake information.

In step 602, the wireless charging receiving circuit generates the control signal according to the handshake information;

the WPC and the PMA are two different wireless charging standards, the two have different working frequencies, and the communication contents between the transmitting end and the receiving end are also different, and the wireless charging receiving circuit module can judge whether the current charging environment is the WPC mode or the PMA mode according to the difference between the WPC and the PMA.

In this step, the wireless charging receiving circuit judges the charging mode (that is, the used wireless charging standard) corresponding to the received handshake information, and then generates the control signal according to the judged charging mode.

When the wireless charging receiving circuit is identified as the WPC mode, the wireless charging receiving circuit controls the dynamic matching circuit so that the WPC wireless charging is in the optimal working state and achieves a high efficient WPC wireless charging transmission; when the wireless charging receiving circuit is identified as the PMA mode, the wireless charging receiving circuit controls the dynamic matching circuit so that the PMA wireless charging is in the optimal working state, so as to achieve a high efficient PMA wireless charging transmission.

In step 603, the wireless charging receiving circuit sends a control signal to the dynamic matching circuit to instruct the dynamic matching circuit to select a corresponding matching circuit from the at least one kind of matching circuit to be connected;

In this step, the control signal indicates the type of the matching circuit suitable for electromagnetic waves received by the receiving coil.

In step 604, the dynamic matching circuit switches and connects to the corresponding circuit in accordance with the control signal, and starts to charge.

The technical solution provided in the embodiment of the present invention can also be extended to other similar electromagnetic induction wireless charging technologies, and may be compatible and coexist with wireless charging technologies besides of the WPC and the PMA mentioned herein, to achieve the high efficient wireless charging.

Those ordinarily skilled in the art can understand that all or some of the steps of the abovementioned embodiments may be implemented using a computer program process, and the computer program may be stored in a computer-readable storage medium and executed on a corresponding hardware platform (such as a system, device, apparatus, equipment and so on), and during the execution, it comprises one of the steps of the method embodiment or a combination thereof.

Alternatively, all or some of the steps of the abovementioned embodiments can also be implemented with integrated circuits, these steps may be made into individual integrated circuit modules respectively, or some of the modules or steps can be made into a single integrated circuit module to implement. Therefore, the present document is not limited to any specific combination of hardware and software.

Each apparatus/functional module/functional unit in the abovementioned embodiments may be implemented with the universal computing apparatus, and they can be concentrated on a single computing apparatus or distributed in a network composed of a plurality of computing apparatuses.

When each apparatus/functional module/functional unit in the abovementioned embodiments is implemented in the form of software functional module and sold or used as an individual product, and they may be stored in a computer readable storage medium. The abovementioned computer-readable storage medium may be a read-only memory, magnetic or optical disk, and the like.

Anyone familiar with the technical field of the art within the scope of the present document disclosing a technique can easily think of change or replacement that shall fall within the protection scope of the present document. Accordingly, the protection scope of the invention should be subject to the protection scope of the claims.

INDUSTRIAL APPLICABILITY

The embodiment of the present invention provides a wireless charging apparatus and method, a receiving coil of the wireless charging apparatus is connected to a dynamic matching circuit, and the dynamic matching circuit comprises a control circuit and at least one kind of matching circuit; the control circuit is connected to the at least one kind of matching circuits respectively, and the control circuit is used for transmitting a control signal for controlling ON and OFF of the at least one kind of matching circuit, and the dynamic matching circuit switches between different wireless charging standard types of matching circuits in accordance with the control signal, selects an appropriate matching circuit to be connected and used, which achieves a flexible wireless charging mechanism and solves the problem of using different wireless charging standards for wireless charging.

The dynamic matching circuit can be used to realize that the wireless charging can achieve a high efficient wireless charging transmission in both the WPC standard and the PMA standard, and it is effectively compatible with both the WPC and PMA standards in the same mobile phone terminal. It effectively solves the WPC and PMA coexisting and compatible problems, and can achieve the high efficient wireless charging in both the WPC and PMA modes.

What is claimed is:

1. A wireless charging apparatus, comprising a receiving coil, wherein the receiving coil is connected to a dynamic matching circuit, and the dynamic matching circuit comprises a control circuit and at least one kind of matching circuit; the control circuit is connected to the at least one kind of matching circuit;
   the control circuit is configured to: transmit a control signal for controlling ON and OFF of the at least one kind of matching circuit,
   wherein the apparatus further comprises a wireless charging receiving circuit;
   the wireless charging receiving circuit is configured to judge a wireless charging standard corresponding to received handshake information, and determine the type of a required matching circuit;
   the wireless charging receiving circuit is configured to generate the control signal according to the handshake information, and indicate a matching circuit selected by the control circuit in the control signal.

2. The wireless charging apparatus of claim 1, wherein, the matching circuit comprises following types:
   wireless power consortium (WPC) matching circuit and power matters alliance (PMA) matching circuit.

3. A wireless charging method applying the wireless charging apparatus of claim 2, comprising:
   a wireless charging receiving circuit sending the control signal to the dynamic matching circuit to instruct the dynamic matching circuit to select a corresponding matching circuit from at least one kind of matching circuit to be connected;
   the dynamic matching circuit switching and connecting to a corresponding circuit in accordance with the control signal and starting to charge.

4. The wireless charging method of claim 3, wherein before the step of the wireless charging receiving circuit sending the control signal to the dynamic matching circuit, the method further comprises:
   the receiving coil sending the received handshake information to the wireless charging receiving circuit via the dynamic matching circuit;
   the wireless charging receiving circuit generating the control signal according to the handshake information.

5. The wireless charging method of claim 4, wherein when the receiving coil sends the received handshake information to the wireless charging receiving circuit via the dynamic matching circuit, the dynamic matching circuit represents high and low levels of a digital signal by changes of transmission frequency, and uses the digital signal to carry the handshake information.

6. The wireless charging apparatus of claim 1, wherein the wireless charging receiving circuit is configured to: connect to a control circuit of the dynamic matching circuit through a control line;
   the wireless charging receiving circuit is configured to: send the control signal to the dynamic matching circuit through the control line to control the dynamic matching circuit selecting one matching circuit from the at least one kind of matching circuit to be connected.

7. A wireless charging method applying the wireless charging apparatus of claim 6, comprising:
   a wireless charging receiving circuit sending the control signal to the dynamic matching circuit to instruct the dynamic matching circuit to select a corresponding matching circuit from at least one kind of matching circuit to be connected;
   the dynamic matching circuit switching and connecting to a corresponding circuit in accordance with the control signal and starting to charge.

8. The wireless charging method of claim 7, wherein before the step of the wireless charging receiving circuit sending the control signal to the dynamic matching circuit, the method further comprises:
   the receiving coil sending the received handshake information to the wireless charging receiving circuit via the dynamic matching circuit;
   the wireless charging receiving circuit generating the control signal according to the handshake information.

9. The wireless charging method of claim 8, wherein when the receiving coil sends the received handshake information to the wireless charging receiving circuit via the dynamic matching circuit, the dynamic matching circuit represents high and low levels of a digital signal by changes of transmission frequency, and uses the digital signal to carry the handshake information.

10. The wireless charging apparatus of claim 1, wherein the control circuit is configured as a switch switching between the at least one kind of matching circuit, and when the switch switches to one matching circuit, the matching circuit is connected.

11. A wireless charging method applying the wireless charging apparatus of claim 10, comprising:
    a wireless charging receiving circuit sending the control signal to the dynamic matching circuit to instruct the dynamic matching circuit to select a corresponding matching circuit from at least one kind of matching circuit to be connected;
    the dynamic matching circuit switching and connecting to a corresponding circuit in accordance with the control signal and starting to charge.

12. The wireless charging apparatus of claim 1, wherein the control circuit is a variable capacitor.

13. A wireless charging method applying the wireless charging apparatus of claim 12, comprising:
    a wireless charging receiving circuit sending the control signal to the dynamic matching circuit to instruct the dynamic matching circuit to select a corresponding matching circuit from at least one kind of matching circuit to be connected;
    the dynamic matching circuit switching and connecting to a corresponding circuit in accordance with the control signal and starting to charge.

14. The wireless charging apparatus of claim 1, wherein the dynamic matching circuit comprises at least two kinds of matching circuits.

15. A wireless charging method applying the wireless charging apparatus of claim 14, comprising:
    a wireless charging receiving circuit sending the control signal to the dynamic matching circuit to instruct the dynamic matching circuit to select a corresponding matching circuit from at least one kind of matching circuit to be connected;
    the dynamic matching circuit switching and connecting to a corresponding circuit in accordance with the control signal and starting to charge.

16. A wireless charging method applying the wireless charging apparatus of claim 1, comprising:

a wireless charging receiving circuit sending a control signal to the dynamic matching circuit to instruct the dynamic matching circuit to select a corresponding matching circuit from at least one kind of matching circuit to be connected;

the dynamic matching circuit switching and connecting to a corresponding circuit in accordance with the control signal and starting to charge, the wireless charging receiving circuit judging a wireless charging standard corresponding to received handshake information, and determining the type of a required matching circuit;

the wireless charging receiving circuit generating the control signal according to the handshake information, and indicating a matching circuit selected by the control circuit in the control signal.

17. The wireless charging method of claim 16, wherein before the step of the wireless charging receiving circuit sending the control signal to the dynamic matching circuit, the method further comprises:

the receiving coil sending the received handshake information to the wireless charging receiving circuit via the dynamic matching circuit.

18. The wireless charging method of claim 17, wherein when the receiving coil sends the received handshake information to the wireless charging receiving circuit via the dynamic matching circuit, the dynamic matching circuit represents high and low levels of a digital signal by changes of transmission frequency, and uses the digital signal to carry the handshake information.

* * * * *